United States Patent [19]

McCollum

[11] 3,967,319
[45] June 29, 1976

[54] TAPE EXCURSION CONTROL MEANS USING TAPERED-WALL VACUUM COLUMN

[75] Inventor: Robert F. McCollum, Oklahoma City, Okla.

[73] Assignee: Telex Computer Products, Inc., Tulsa, Okla.

[22] Filed: July 1, 1974

[21] Appl. No.: 484,606

[52] U.S. Cl.............................. 360/90; 137/525.3; 137/543.15; 137/533.11
[51] Int. Cl.²................... G11B 15/58; G11B 15/48
[58] Field of Search ...... 360/90; 137/525.3, 543.15, 137/533.11

[56] References Cited
UNITED STATES PATENTS

| | | | |
|---|---|---|---|
| 2,451,626 | 10/1948 | Marshall, Jr. | 137/543.15 |
| 3,170,045 | 2/1965 | Baumeister et al. | 360/90 |
| 3,286,728 | 11/1966 | Stephenson | 137/525.3 |
| 3,289,693 | 12/1966 | Scaramucci | 137/525.3 |
| 3,766,940 | 10/1973 | Mason | 137/533.11 |

*Primary Examiner*—Alfred H. Eddleman
*Attorney, Agent, or Firm*—Head, Johnson & Chafin

[57] ABSTRACT

This abstract describes apparatus for improving the operation of magnetic tape decks which have two parallel wall vacuum columns and two tapered wall vacuum columns, in which means are provided to minimize the tape excursion in the tapered columns. Because of the small mass of the tape in the tapered columns, the tape can accelerate very rapidly, and when doing so may cause a reversal of air flow from the vacuum columns acting like an air pump, for example, when the tape is moving outwardly. In the tapered column, with wide excursiOns of the tape, there is danger of flutter and oscillation when the tape force varies in a pulsating manner and a resonance can be set up. A check valve is applied between the tapered vacuum column and the vacuum plenum, so that when there is an outward excursion of the tape the check valve will close and there will be an increasing vacuum in the column. This will provide a greater force restricting outward movement of the tape.

7 Claims, 8 Drawing Figures

TAPE EXCURSION CONTROL MEANS USING TAPERED-WALL VACUUM COLUMN

BACKGROUND OF THE INVENTION

This invention lies in the field of magnetic tape recording and playback systems. More particularly, it concerns tape decks which have both parallel wall vacuum columns and tapered wall vacuum columns. Still more particularly, this invention concerns means for restricting the amplitude of movement of the tape in the tapered vacuum columns.

Magnetic tape drives utilize constant width vacuum columns to maintain constant tension in the tape as it passes across the read/write head. In recent years tape drives have also used smaller tapered vacuum columns, or acceleration pockets, between the main constant width columns and the read/write head. These tapered columns decrease the mass of tape which must be rapidly accelerated by the tape driver, or capstan. The tape loop in the tapered column seeks its own position based upon pressure differential across the tape, and tape tension, friction, and dynamic acceleration forces. Thus, during acceleration of the tape drive the tape loops in the tapered columns constantly move inward and outward seeking a force balance. The distance the loop moves from maximum inward position to maximum outward position is called the tape loop excursion. During certain operating conditions such as start-stop, forward, reverse, or by-directional movements, the loop excursion can be excessive at certain resonant frequencies. This invention deals with a means to decrease this excessive loop excursion.

SUMMARY OF THE INVENTION

It is a primary object of this invention to provide a means for restricting the amplitude of excursion of the tape in the tapered vacuum chambers.

This and other objects are realized and the limitations of the prior art are overcome by placing a check valve in the vacuum opening between the tapered column and the vacuum plenum. If this vacuum opening were closed then outward movement of the tape in the vacuum coluum would cause an even greater vacuum and greater differential pressure across the tape, and therefore the tape excursion would be limited. Unfortunately, with the vacuum opening open between the vacuum column and the plenum, outward excursion of the tape causes air movement from the vacuum plenum into the column and, therefore, the larger pressure differential and restraining force, does not develop. This invention is directed to providing means for placing a check valve in the connection between the vacuum column and the vacuum plenum, so that with rapid outward movement of the tape the check valve will close and a greater pressure differential will develop across the tape.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
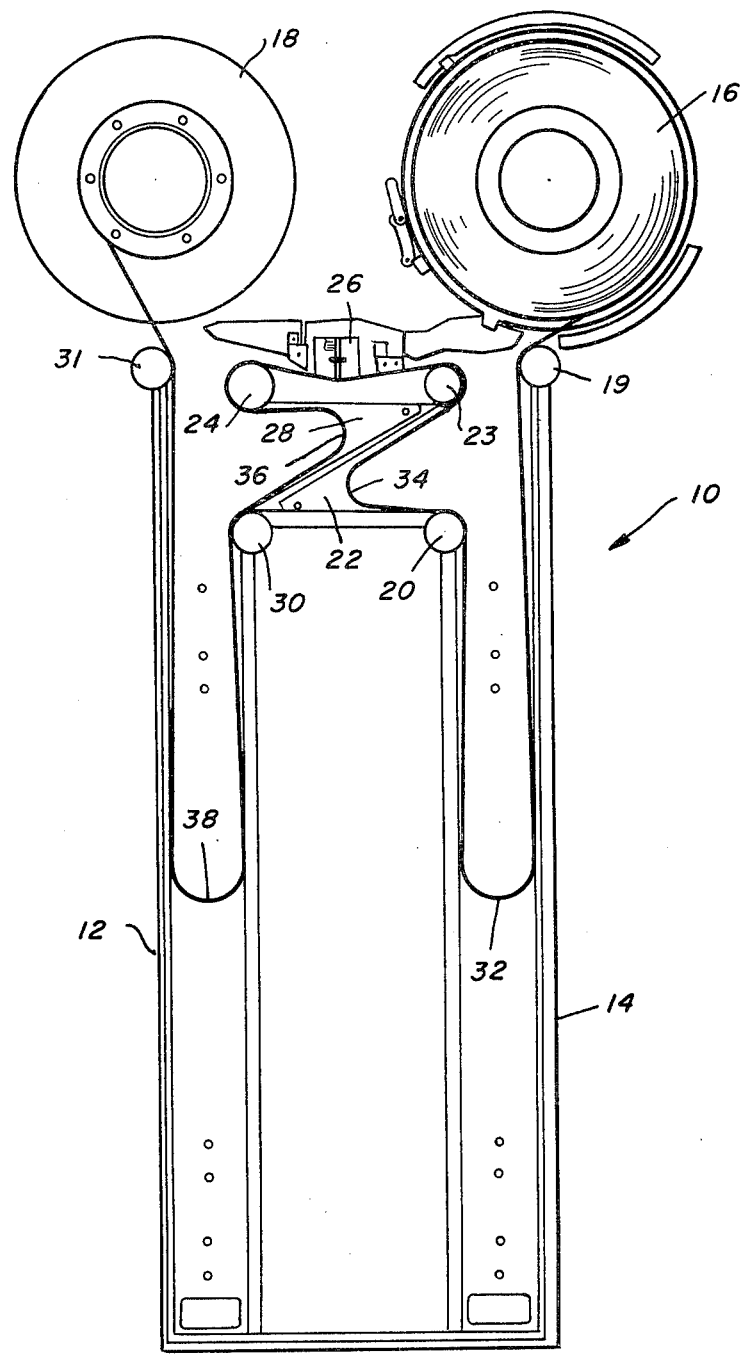
FIG. 1 illustrates an overall elevation view of a present day magnetic recording tape deck having two constant width vacuum columns and two smaller tapered vacuum columns for control of the tape.

Referring now to the drawings, FIG. 1 represents in elevation view a typical magnetic tape deck 10 having two constant width, or parallel wall, vacuum columns 12 and 14, and two tapered wall vacuum columns 22 and 28. The tape is unreeled from the supply reel 16 over roller or air bearing 19 to form a loop 32 inside of the parallel wall column 14. The tape then moves over roller or air bearing 20 and forms a loop 34 in the tapered vacuum column 22. The tape then moves over roller or air bearing 23 under the read/write system 26 over the capstan roller 24, forming a loop 36 in the second tapered vacuum column 28. The tape then moves over roller or air bearing 30 forming the loop 38 inside of the second constant width vacuum column 12, over roller or air bearing 31, and to the take-up reel 18.

Figure 2:
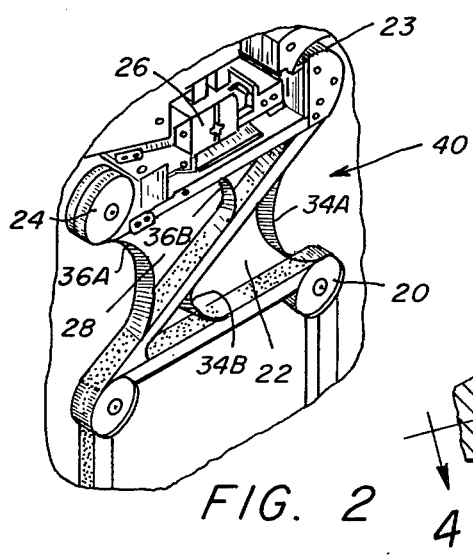
FIG. 2 illustrates a detail of the tapered vacuum columns indicating the extent of tape excursion possible.
Figure 3:
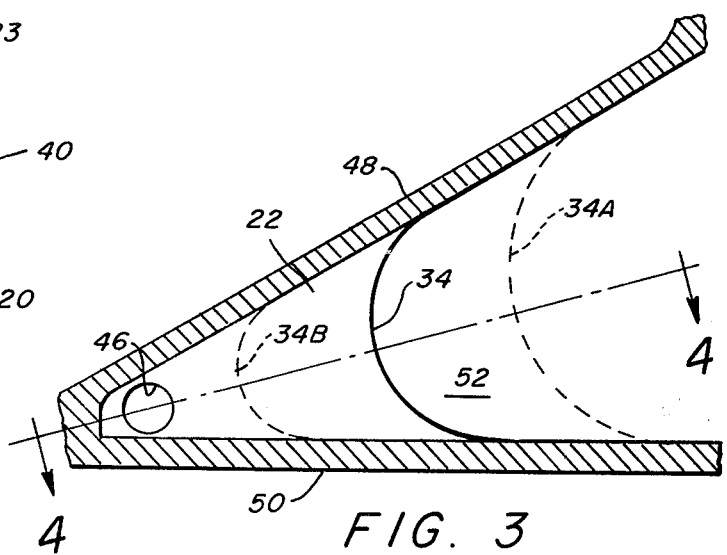
FIG. 3 is a cross sectional view of one of the tapered columns.

FIG. 2 shows in somewhat more detail, the tapered vacuum columns 22 and 28, with the tape loops 34 and 36 shown in two extreme positions 34A, 34B, and 36A, 36B inside of the tapered columns. A vertical cross section across the lower tapered vacuum column 22 is shown in FIG. 3. This comprises the two walls 48 and 50 with the tape loop 34 and the opening 46 leading from the vacuum column 22 into a vacuum plenum 58 at the rear. This is shown in more detail in FIGS. 4A, 4B, 4C, 4D, and 4E. Shown in dashed curves in FIG. 3 are the extreme positions 34A and 34B of the tape loop.

The purpose of the vacuum column 22 is to provide a restraint on the tape loop which will balance the tension in the loop caused by the movement of the tape and the tape drive friction, etc. In the position 34A the total force on the tape is the product of the diameter of loop times the pressure differential between the air on the outside of the loop (which is ambient atmospheric pressure) and the pressure on the inside of the loop which is the pressure of the vacuum plenum 58. When the tension in the tape is large, the tape loop will move outwardly and a larger area of tape will be subject to the pressure differential of the air pressure outside and inside the loop. When the tension in the tape is reduced, the differential pressure will cause a movement inward of the tape loop to the position 34 or even down to to the smaller loop 34B, depending on the magnitude of the tension in the tape.

When there is a rapid movement outwardly of the tape, that is, when there is a momentary large tension in the tape, it will move rapidly from the position 34B out to the position 34A. If a strong vacuum can be maintained inside the loop, then there will be a greater restraint on the tape, and there will be less tendency for the tape to move to the extreme position 34A.

Figure 4A:
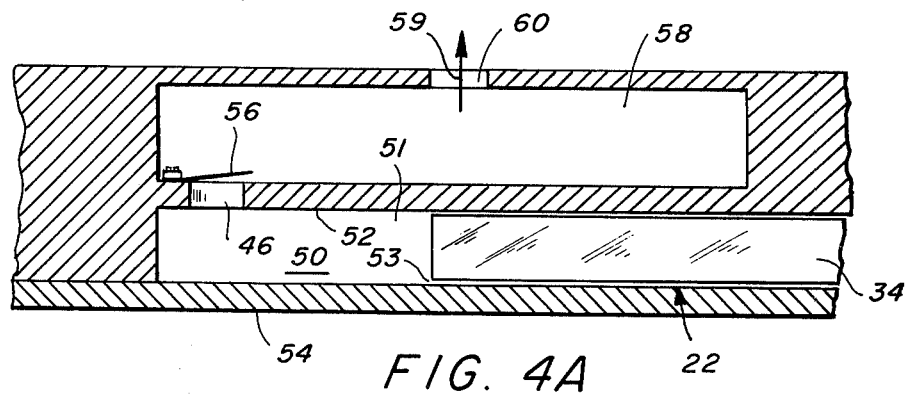
FIGS. 4A, 4B, 4C, 4D and 4E illustrate various types of check valves that can be utilized to minimize the tape excursion in the tapered vacuum columns.

Referring now to FIG. 4A, air is drawn from the space 51 in the vacuum column 22 through opening 46 into the vacuum plenum 58, and out of the vacuum plenum through 60 in accordance with arrow 59 to a vacuum pump (not shown). Air leaks into the space 51 through the narrow openings 53 between the tape 34 and the vacuum column walls 54, 52. So there is only a moderate vacuum present.

It has been observed, with rapid outwardly movement of the tape loop, that air is drawn from the plenum 58 into the column space 51 through the opening 46, the outwardly moving tape acting like a piston. This tends to keep the pressure in the space 51 more or less constant. However, with a check valve, formed by the flapper 56 across the opening 46, air can not be drawn into the space 51. Thus, when the tape loop 34 moves to the right to increase volume in the space 51, the pressure in space 51 will decrease, and the differential pressure across the tape loop will increase. With the larger differential pressure, a given magnitude of tension in the tape can be balanced with a shorter tape loop, 34 than would normally be required, 34A, under high tape tension.

Thus, the invention is basically to prevent rapid outward movement of the tape loop under high tape tension, by placing a check valve between the vacuum plenum and the tape column so that air can only move from the column into the plenum, but not in the reverse direction. If the check valve 56 were not in position, on high tape tension, the tape would move out to the large loop 34A and when the tension was removed, the differential pressure would cause a rapid acceleration into the tape column and, therefore, there would be in effect an overshooting of movement of the tape in both directions. When the period of oscillation of tension in the tape matched the dynamic conditions of the tape and the loop, etc. there would be set up a resonance, and very large amplitude of movement of the tape which could cause damage to the tape itself and a loss of smooth movement of the tape across the read/write heads. The use of the check valve 56 therefore prevents undesirable mechanical oscillation and improves the smooth operation of the tape deck.

Figure 4B:
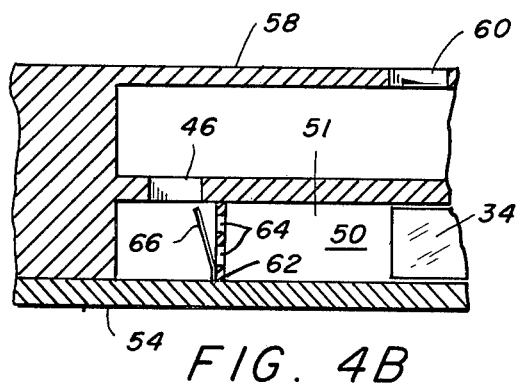

In FIG. 4B another embodiment of the check valve is shown installed on a grid across the small end of the tapered vacuum column, with the openings 64 and a flapper 66, which serves as a check valve.

Figure 4C:
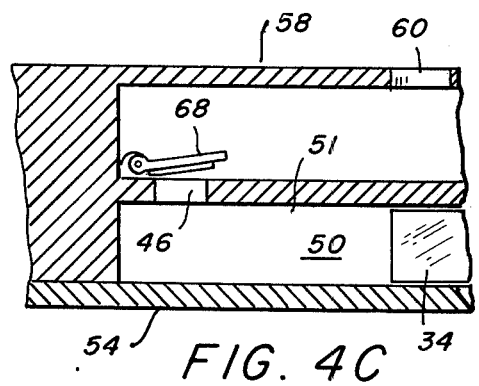
Figure 4D:
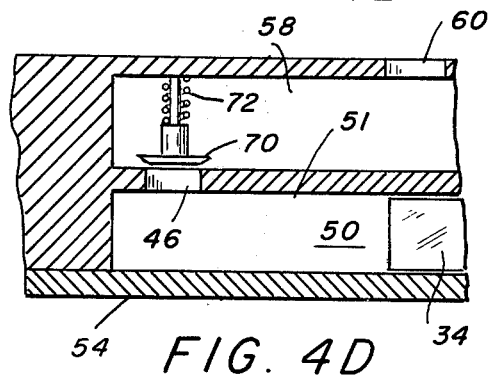
Figure 4E:
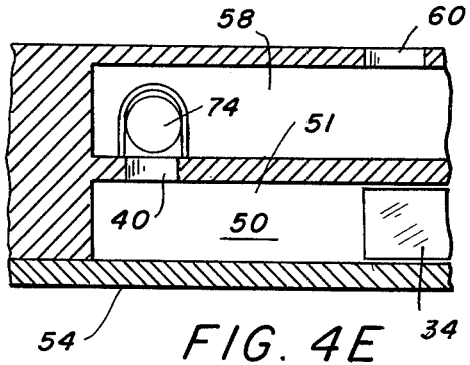

In FIG. 4C another embodiment is shown with a hinged clapped 68 across the opening 56. In FIG. 4D another embodiment shows a spring supported closure means 70 across the opening 46. When air moves from space 51 to 58, the weak spring 72 permits the closure 70 to move back. Then when there is a tendency for air to move in the reverse direction that is from the plenum chamber 58 into the column 51, the closure 70 seals the opening 46. FIG. 4E shows another embodiment in which a small spherical closure element or ball is used to provide a check valve action at the opening 40.

While this invention has been described in terms of a tape deck having two large parallel wall vacuum columns and two tapered columns, it can be used in any combination of vacuum columns provided there is at least one tapered vacuum column.

While the invention has been described with a certain degree of particularity it is manifest that many changes may be made in the details of construction by the arrangement of components. It is understood that the invention is not to be limited to the specific embodiment set forth herein by way of exemplifying the invention, but the invention can be limited only by the scope of the attached claim or claims, including the full range of equivalency to which each element or step thereof is entitled.

What is claimed:

1. In a magentic tape system having at least one tapered-wall vacuum column for control of the tape movement, the improvement in means to minimize the excursion of the tape in the tapered-wall vacuum column under increasing tension in the tape, comprising:
    a. wall means between said tapered-wall vacuum column and a vacuum plenum and an opening in said wall means; and
    b. check valve means across said opening adapted to permit free flow of air from said column to said plenum, but not in the reverse direction.

2. The apparatus as in claim 1 including a second tapered vacuum column and two constant width vacuum columns and two openings between said two tapered vacuum columns and said plenum, and check valve means across both of said openings.

3. The apparatus as in claim 1 in which said check valve comprises a plane reed.

4. The apparatus as in claim 1 in which said check valve comprises a wall across the small end of said tapered column and a plane reed across at least one opening in said wall.

5. The apparatus as in claim 1 in which said check valve comprises a hinged flapper valve across said opening.

6. The apparatus as in claim 1 in which said check valve comprises a spring loaded poppet check valve.

7. The apparatus as in claim 1 in which said check valve comprises a ball check valve.

* * * * *